United States Patent [19]

Yoder

[11] 4,249,643
[45] Feb. 10, 1981

[54] METHOD AND APPARATUS FOR ACTUATING TRAILER BRAKES

[75] Inventor: Herbert G. Yoder, Bellefontaine, Ohio

[73] Assignee: Yoder Brake & Manufacturing Co., Inc., Urbana, Ohio

[21] Appl. No.: 738,755

[22] Filed: Nov. 4, 1976

[51] Int. Cl.³ .............................................. B60T 7/20
[52] U.S. Cl. ................................ 188/112 R; 188/3 H; 188/345
[58] Field of Search ................... 188/3 R, 3 H, 106 P, 188/112, 142, 345; 180/14 R, 103 R, 103 BF; 280/446 R; 303/6 C

[56] References Cited

U.S. PATENT DOCUMENTS

| 2,008,975 | 7/1935 | Boughton et al. | 188/3 R |
| 2,202,221 | 5/1940 | Miller | 188/112 |
| 2,213,947 | 9/1940 | Bowen | 188/345 |
| 3,109,521 | 11/1963 | Krotz | 188/112 |
| 3,220,189 | 11/1965 | Caramanna | 188/345 |
| 3,342,292 | 9/1967 | Wherry | 188/112 |
| 3,404,757 | 10/1968 | Beach et al. | 188/112 |
| 3,456,988 | 7/1969 | Gibbons et al. | 303/6 C |
| 3,505,815 | 4/1970 | Wherry | 188/112 |
| 3,682,278 | 8/1972 | Wherry et al. | 188/112 |
| 3,923,345 | 12/1975 | Poggie | 188/106 P |
| 3,948,544 | 4/1976 | Presley et al. | 188/112 |

FOREIGN PATENT DOCUMENTS

| 2127717 | 12/1972 | Fed. Rep. of Germany | 188/112 |
| 1109082 | 1/1956 | France | 188/142 |

Primary Examiner—Edward R. Kazenske
Attorney, Agent, or Firm—Robert E. Stebens

[57] ABSTRACT

A trailer brake actuator and method of operation in which the actuator is interposed between a towing vehicle and a trailing vehicle and is operable upon a change in the distance between the vehicles to displace actuating fluid to the trailer brakes. The actuator is effective in both directions of relative movement between the vehicles, and in each direction of movement, the development of pressure above a predetermined minimum pressure or relative movement of the actuator parts beyond a predetermined amount will cause the pressure in the brake system to be released.

5 Claims, 8 Drawing Figures

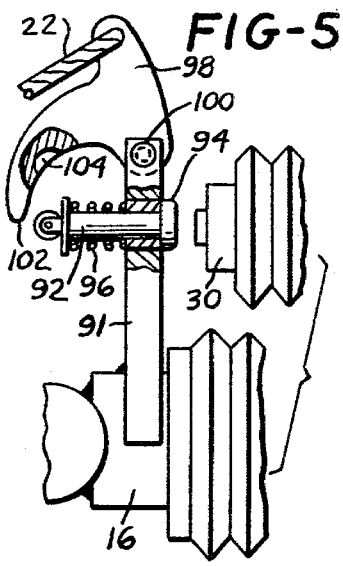
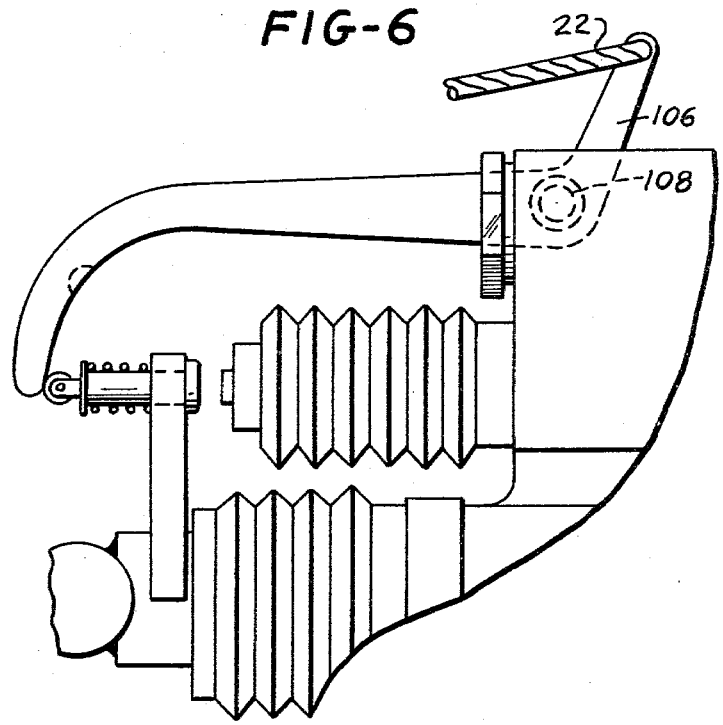
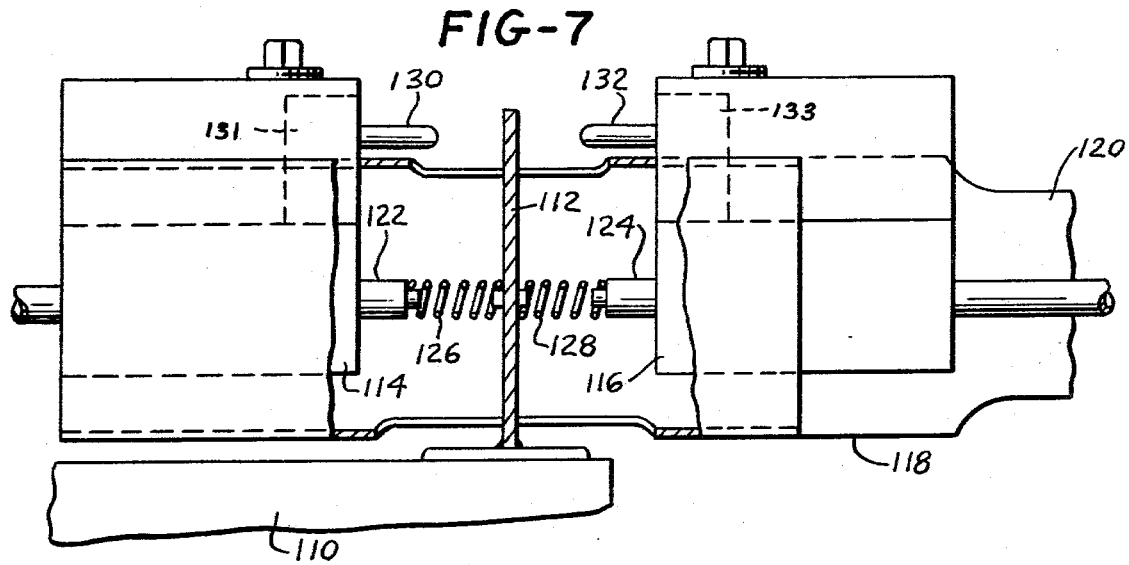
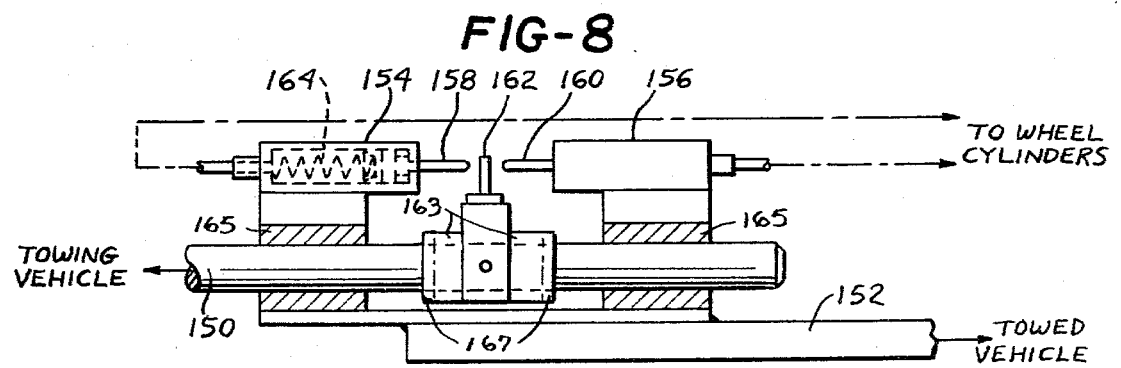

METHOD AND APPARATUS FOR ACTUATING TRAILER BRAKES

The present invention relates to a trailer brake actuator and a method of operation.

Trailer brake actuators are known and comprise devices to interpose between a towing vehicle and a trailing vehicle and which are operable in response to the trailer running up on the towing vehicle for displacing fluid from the actuator. The actuator is connected in circuit with hydraulically actuated trailer brakes and thus actuates the trailer brakes when fluid is displaced from the actuator.

Such brake arrangements are shown, for example, in U.S. Pat. Nos. 3,342,292, 3,682,278 and 3,881,577. A particular feature of certain ones of the brakes of the prior art resides in the provision for releasing the brake actuating pressure when this pressure exceeds a predetermined amount. This feature becomes of importance when a vehicle is backing up with a trailer attached thereto, and the resistance to backing up of the trailer is such that the trailer brakes become actuated.

When this occurs, continued rearward movement of the towing vehicle will cause the brake pressure in the trailer brake system to increase, and when this pressure reaches a predetermined amount which is substantially greater than that required to set the trailer brakes, the pressure will be released, thereby releasing the trailer brakes and permitting the trailer to be backed up.

The braking system referred to above operates satisfactorily for relatively small trailers and for accomplishing automatic trailer braking in the forward direction. However, with larger trailers, it can be desirable to have automatic braking action in the reverse direction of the trailer for the purpose, for example, of holding the trailer vehicle on a hill or the like.

It is in particular connection with what could be referred to as a "double acting" trailer brake actuator that the present invention is particularly concerned.

BRIEF SUMMARY OF THE INVENTION

According to the present invention, a pair of master cylinders for a hydraulic braking system are arranged in side by side relation with their actuators protruding therefrom in respective directions. Adjacent the master cylinders is a rod having a plate member extending into opposed relation with the end of a respective one of the master cylinder actuators. Spring means is provided which normally holds the rod in a centered relation with both of the plates spaced from the pertaining master cylinder actuators.

A common frame, which may be a casting, houses the rod and the master cylinders, a reservoir for containing fluid for the master cylinders, and a pair of spring loaded expansion chambers, one for each master cylinder. It is, of course, possible to have a single expansion chamber by having a piston in each end with a spring therebetween and each master cylinder connected to a respective end of the chamber.

The frame referred to is mounted on the hitch bar or tongue of the trailing vehicle. The frame, as mentioned, is preferably in the form of a casting and forms the member through which thrusts are transmitted from the towing vehicle to the trailer vehicle.

The rod referred to above extends outwardly in a direction toward the towing vehicle and is connected thereto.

In a preferred modification, each of the master cylinders is connected with the trailer brake cylinders with a directional control valve interposed between the connections leading to the master cylinders so that one only thereof at a time will supply fluid to the trailer brakes.

In another form which the invention can take, each wheel of the trailer which is to be braked has two cylinders, one acting on the front shoe of the brake and the other acting on the rearward shoe. In this case, each of the master cylinders referred to is connected to a respective brake actuating cylinder.

The arrangement according to the present invention also comprises a more or less conventional break-away control so that breaking of the power connection between the towing vehicle and the trailing vehicle will cause the brakes of the trailing vehicle to be locked in actuated position.

In operation, the spring holding the rod in centered positions in the frame of the actuating device is strong enough to sustain thrusts that might be encountered in normal movement of the vehicles forwardly and rearwardly on the level. However, upon braking of the towing vehicle when going in either direction, the centering spring for the rod will be overcome and the rod will move in the frame and one of the plates will engage the actuator for one of the master cylinders and actuate the trailer brakes.

As mentioned, each master cylinder is so arranged that when the pressure built up by the braking system reaches a predetermined amount the pressure will be released from the system. This is accomplished by providing the master cylinder with a cut out or notch or groove in the wall thereof at a certain position therealong, or by providing other suitable sort of pressure releasing arrangement for the system.

The exact nature of the present invention will become more clearly apparent upon reference to the following detailed specification taken in connection with the accompanying drawings in which:

FIGS. 5 and 6 show break-away actuated devices for setting the trailer brakes.

FIGS. 7 and 8 show modifications of the invention in respect of actuation of the master cylinders.

DETAILED DESCRIPTION OF THE INVENTION

Figure 1:
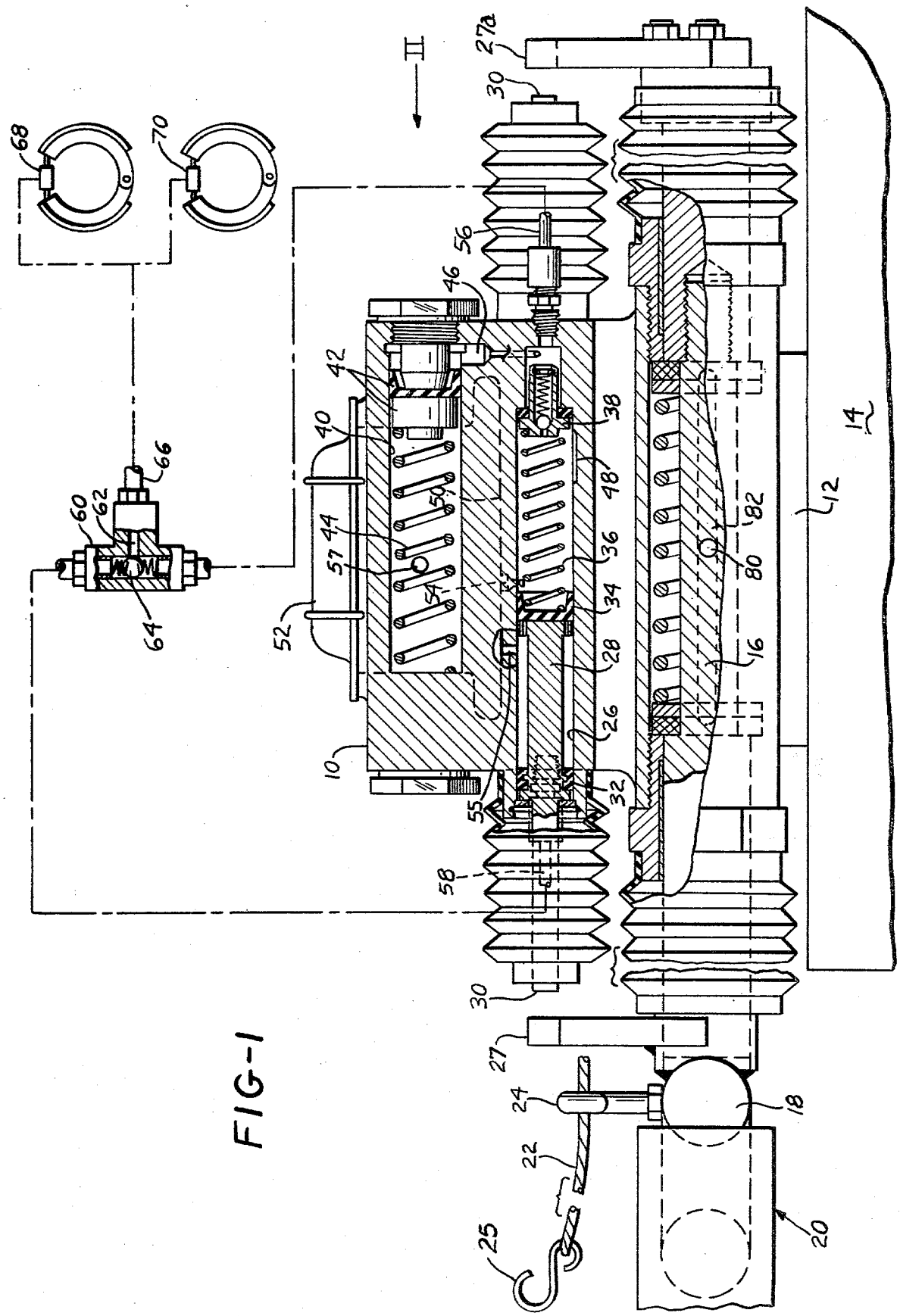
FIG. 1 is a view looking in at the side of a trailer brake actuator according to the present invention with the actuator partly broken away to show details thereof.
Figure 2:
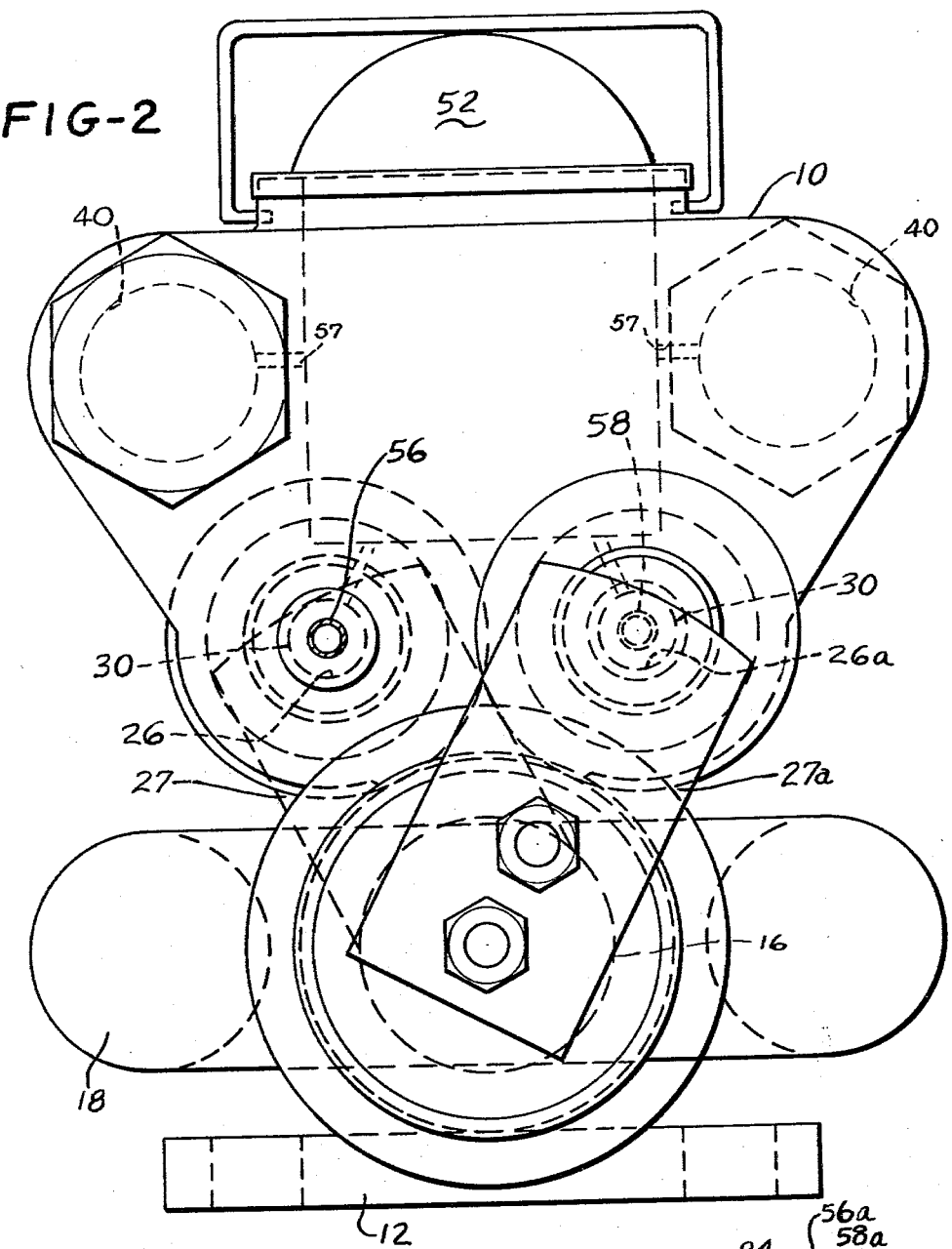
FIG. 2 is an elevational view looking in from the rear of the unit as indicated by arrow II on FIG. 1.

Referring to the drawings somewhat more in detail, in particular, with reference to FIGS. 1 and 2, the trailer brake actuating device according to the present invention comprises a frame 10 which may be a casting or the like and which is provided with a mounting foot 12 at the bottom adapted for being fixedly connected to a hitch frame or tongue 14 which, to the right side of FIG. 1, is connected to a vehicle being towed and is preferably rigid therewith.

The frame has reciprocable therein a rod 16 which extends leftwardly out of frame 10 and terminates at the left end in a coupler 18 which is connectable to a towing vehicle which is generally indicated at 20. Rod 16 has a pair of actuator arms 27, 27a connected thereto for actuation of the master pistons of the brake system when rod 16 moves in respective directions from a centered position.

Figure 3:
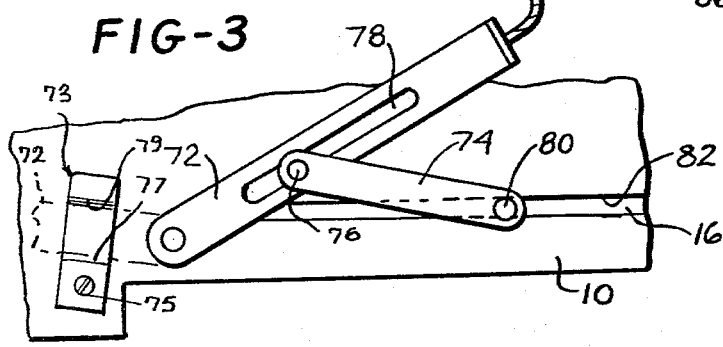
FIG. 3 is a fragmentary view showing one form which a break-away control device can take.

Also connected to the towing vehicle is a cable 22 which is freely runnable in eye 24 carried on coupler 18 and which leads backwardly to a breakaway control device which is illustrated in FIG. 3 and which will be described hereinafter. The end of this cable 22 is detachably connectable with the towing vehicle by a hook 25.

The frame 10 is provided with a pair of bores 26, 26a (only bore 26 being visible in FIG. 1), one extending inwardly from the left side of frame 10 and the other extending inwardly from the right side. The bores 26, 26a form the cylinders of master cylinders and a respective plunger or piston 28 is mounted in each thereof and extends out the open end of the respective cylinder and has an actuator rod portion 30 integral therewith. Each plunger 28 has a sealing ring 32 thereon near the open end of the cylinder and a pressure cup 34 at the other end substantially conventional but free of any interruption or groove in the periphery.

A compression spring 36 maintains cup 34 in engagement with the end of plunger 28, and at the end opposite plunger 28, bears on valve 38 located in the discharge end of the cylinder and operable, in a known manner, to maintain a predetermined minimum pressure in the brake system connected thereto which is less than that required to cause the pertaining brake shoes to move outwardly into engagement with the brake drums associated therewith.

Each cylinder 26, 26a has associated therewith in frame 10 a respective expansion chamber 40 formed by an axial bore in frame 10 and a piston arrangement 42 in the bore. As mentioned, a single expansion chamber having a piston in each end with a spring therebetween and supplied by a respective cylinder at each end could be employed. The piston 42 in the expansion cylinder shown in FIG. 1 is backed up by compression spring 44 on the left side while the right side of the piston 42 is connected by passage 46 with the master cylinder above described, said connection being located, for example, on the downstream side of valve 38.

A feature of the present invention is to be found in the longitudinally extending undercut 48 formed in each master cylinder near the maximum point of advance of the respective plunger and piston cup therein. These cut outs are provided so that, when the respective master cylinder piston is advanced beyond that point at which the brakes connected thereto are set, fluid will be displaced from the brake system into the respective expansion chamber until piston cup 34 comes within the range of undercut 48, and at which time the pressure in the braking system will be released thus releasing the actuated brakes.

The frame 10, furthermore, includes a reservoir 50 through which access can be had by way of the conventional sheet metal cover 52. Reservoir 50 is connected to each cylinder 26 forwardly of the respective cup 34 when the latter is in retracted position by a respective passage 54, and rearwardly of the cup by a passage 55, and it is through these passages that brake fluid will return to the reservoir when cup 34 comes within the range of notch 48. Further, when the plunger or piston 28 retracts, the same passages insure filling of the forward part of the cylinder.

The master cylinders have respective discharge lines 56 for the master cylinder which is actuated when braking occurs during forward travel of the vehicles and 58 for the master cylinder from which fluid is displaced during braking of vehicles in rearward direction. The two lines 56 and 58 lead to the inlet ports of a directional valve 60 having a center outlet 62 and a valve member 64 which normally connects one only of the lines 56, 58 to outlet port 62.

Outlet port 62 is connected by a line 66 with the brake cylinders of the trailer brakes, one of which is shown at 68 in FIG. 1, and another of which is shown at 70 in FIG. 1. There may be as many brake cylinders as there are trailer wheels if so desired.

As will be seen in FIG. 3, there is pivotally connected to one side of frame 10 a lever 72, to the upper end of which is connected the rearward end of the break-away cable 22 previously referred to. If the trailer should break away from the towing vehicle, the cable 22 will be pulled toward the left in FIG. 3, and when moved a certain distance in that direction, will snap the illustrated linkage over center and hold the trailer brakes locked in actuated condition.

To accomplish this, a second lever 74 has a pin 76 engaging an axial slot 78 formed in lever 72. Link 74, furthermore, has a pin 80 which, as will be seen in FIG. 1, is connected to rod 16 and extends through a slot 82 in frame 10.

In operation, when the rod 16 is moved in frame 10 by relative motion of the vehicles, the lever 72 will be free to swing in the leftward direction, while in the rightward direction of movement, the pin 76 can slide in slot 78. The break-away mechanism, thus, does not interfere with normal operation of the brake actuator but, upon breaking away of the towing vehicle, the break-away linkage 72, 74 will, as mentioned, snap over center and lock the trailer brakes in actuated condition even if, thereafter, cable 22 breaks or if the hook 84, by means of which it is connected to the towing vehicle, straightens out.

With the two master cylinders referred to above, namely, master cylinder 26, which has been described in some detail above, and the companion master cylinder 26a, which will be seen in elevation in FIG. 2, this offers the possibility of operating different sets of brakes upon braking in forward and reverse directions.

Figure 4:
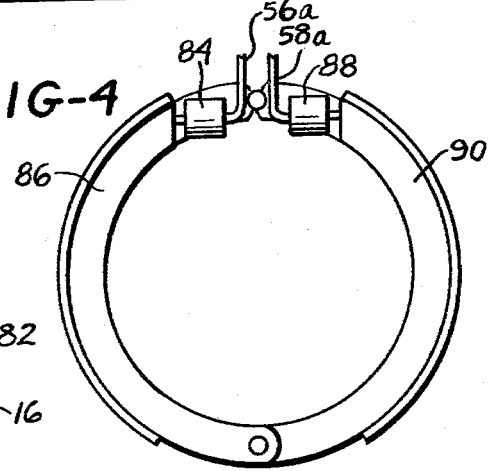
FIG. 4 is a schematic view showing a brake having two different brake cylinders pertaining thereto.

This is schematically illustrated in FIG. 4, in which line 56a, corresponding to the line which is under pressure during forward braking, goes to a brake cylinder 84, which operates on brake shoes 86, 90.

Similarly, brake line 58a, which is pressurized when braking occurs when in reverse motion of the vehicles, goes to a cylinder 88 which operates on brake shoes 90, 86.

FIGS. 5 and 6 show arrangements for locking the trailer brakes in actuated position when the towing vehicle and the trailer vehicle break apart.

In FIG. 5, an upright arm 91 fixed to the reciprocable rod 16 is positioned for actuating the master piston 30 adjacent thereto. The arm 91 has a plunger 92 therein with a head 94 on the end facing the master piston 30, while a spring 96 biases plunger 92 toward the position in which it is illustrated in FIG. 5.

The break-away cable 22, referred to in connection with FIG. 1, is connected to one arm of a cam lever 98 which is pivoted at 100 on the upper end of arm 91. Cam lever 98 has a cam surface 102 formed thereon which, when break-away cable 22 is moved toward the left, as would occur upon the vehicles braking apart, will engage plunger 92 and move it into engagement with master piston 30 and depress master piston 30 in its respective master cylinder into brake actuating position.

The cam surface 102 comprises a recess 104 which will engage the end of plunger 92 so that once the plunger is moved to brake actuating position by the cam lever, the cam lever will latch in position and can thereafter only be released manually. The break-away feature is, of course, for safety purposes.

In FIG. 6, the same arrangement is illustrated and the same reference numerals are employed. The exception being that the cam lever, indicated at 106 in FIG. 6, is pivoted at 108 on the casting in which the master cylinders are formed. In operation, the mechanism of FIG. 6 operates in the same manner as the mechanism of FIG. 5, except that the break-away lever is carried by the master cylinder structure and is movable therewith and is not in any way sensitive to reciprocation of the rod 16 as the vehicles move relatively.

FIG. 7 shows a modification in which the towing vehicle has a tongue member 110 thereon and upstanding from the tongue member is a presser foot 112. The presser foot is disposed between master cylinders 114 and 116 which are carried in some suitable sort of frame 118 which may include means at 120 for the coupling thereof to a towed vehicle.

Master cylinder 114 has a master piston 122 and master cylinder 116 has a master piston 124. The master pistons terminate on opposite sides of presser foot 112 and interposed between the presser foot and each of the master pistons is a respective compression spring 126, 128.

In the FIG. 7 arrangement, normally closed valves 131, 133 are connected between each master cylinder and the reservoir. When relative movement between the vehicles occurs as, for example, during braking or acceleration, the master piston toward which presser foot 112 moves will be actuated by the respective compression spring. The spring is selected strong enough to actuate the trailer vehicle brakes and, upon continued relative movement of the vehicles after the brakes have been actuated, the presser foot will engage one or the other of valve actuating plungers 130, 132 which will release fluid from the master cylinder system of the actuated one of the master cylinders back to a reservoir. The plungers 130, 132 could actuate the respective valve directly, or could act as triggers and cause sudden opening of the respective valve as soon as the pertaining plunger was moved by the presser foot.

The arrangement of FIG. 7 can be used in place of the arrangement of FIG. 1, or it can be incorporated in the FIG. 4 arrangement, if so desired.

FIG. 8 shows another modification, in which a rod 150 is connected to a towing vehicle and a tongue or the like at 152 is connected to the towed vehicle. Mounted on the member 152 is a pair of master cylinders 154, 156, each having a respective master piston 158, 160 and between which is a presser foot 162 connected to rod 150.

It will be apparent that in the arrangement of FIG. 8, any relative movement between the vehicles will immediately result in movement of the presser foot 162 toward one of the master pistons. Master brake cylinders of the nature illustrated often include an internal spring element, as indicated at 164 in dotted lines in FIG. 8, and under mild conditions these springs may sustain the thrust between the vehicles. More often, however, if any sizeable load is imposed on the rod 150, the respective master cylinder will be collapsed by any of the arrangements already described in which the fluid is released from the system after the brakes have been set.

In such an instance, the FIG. 8 arrangement may lose the brakes of the towed vehicle for braking in the direction in which the vehicles are moving. However, if the vehicles are running at constant speed on a substantially level surface, the presser foot 162 will tend to center between the master pistons and the braking of the vehicles in conformity with the present invention in either direction of acceleration will be had.

In either case, assuming the vehicles to be going up hill, for example, if the towing vehicle is braked, then the towed vehicle will run ahead a slight distance and the presser foot 162 will take a neutral position between the master pistons and, then, if the towing vehicle must stand at rest on the hill, the trailer brakes will be actuated by presser foot 162 when the towing vehicle tends to coast backwardly, thereby relieving the brakes of the towing vehicle of the load which it would otherwise be imposed thereon.

In connection with the FIG. 8 arrangement, it will be appreciated that, by the provision of collars or abutment elements 163 shown therein, a solid bearing would be provided between the towing vehicle and the towed vehicle in each direction of movement. In this case, when the towing vehicle started forwardly, the brakes under the control of cylinder 154 would be actuated and continued motion of the towing vehicle would cause the brakes to release in conformity with any of the previously described modifications, whereupon the left hand collar 163 would abut the support member 165 supporting cylinder 154 and provide a solid driving connection from the towing vehicle to the towed vehicle. Upon breaking of the towing vehicle, of course, the presser foot 162 would move rearwardly and actuate cylinder 156 to provide braking of the vehicle in the forward direction.

Each collar 163 could have cushioning means schematically indicated at 167 to cushion engagement thereof with the respective support block 165.

In the case of any of the modifications illustrated, the fluid in the reservoir would freely communicate with the rearward side of any fluid displacing elements or any elements displaced by fluid. For example, in FIG. 1, ports 55 communicate the reservoir 50 with the space rearwardly of the master pistons while the ports indicated at 57 could be provided for communicating the space in each expansion chamber rearwardly of the piston cup 42 therein with the reservoir.

With reference to the locking device illustrated in FIG. 3, this device can, as is known, move over center and thus be disposed in a locked position and hold the trailer brakes set. It is also possible, however, to stop the arm 72 in a position prior to the dead center position thereof and latch the arm in that position.

FIG. 3, for example, shows how a spring catch 73 could be mounted, as by screw 75, to the frame of the brake actuator device with the spring provided with an upwardly facing ledge 77 against which arm 72 stops when moved in brake actuating direction and with a spring catch 79 formed on the outer end thereof which will snap over arm 72 and hold it in place when it is moved into actuated position.

It will be understood that, while the actuated brakes illustrated are hydraulic brakes with fluid being displaced directly from the master cylinder to the brake cylinders, it is possible to utilize the present invention in which the brakes are actuated electrically, or pneumatically, or in any other way, with there being provided an interface system interposed between the actuator device of the present invention and the brakes to be actuated thereby.

Modifications may be made within the scope of the appended claims.

What is claimed is:

1. An actuator device for actuating trailer vehicle brakes in response to relative fore and aft movement between a trailer vehicle and a towing vehicle connected to the trailer vehicle, said device comprising; a frame adapted for connection to one of said vehicles and a rod reciprocable in the frame in the fore and aft direction and adapted for connection to the other of said vehicles, a pair of master cylinders in said frame each having a master piston therein and each master piston operable for displacing fluid from the respective master cylinder in response to movement of said rod in a respective one of said fore and aft directions from a centered position thereof in said frame, individual spring elements resilient in the fore and aft directions and bearing between said rod and each of said master pistons, means connected to said master cylinders and adapted for actuating the brakes of the trailer vehicle in response to the displacement of fluid from said master cylinders, expansion chamber means in said frame connected to receive fluid displaced from said master cylinders when the pressure thereof is above maximum brake actuating pressure, and release means operable for releasing fluid from each master cylinder when the pressure therein exceeds a predetermined amount so as to release the trailer brakes connected to the respective cylinder.

2. An actuator device according to claim 1 in which said brakes are hydraulically actuated by the fluid displaced from said master cylinders, and the device includes valve means connected to said master cylinders and operative to connect the one thereof which is under pressure to the brakes of the trailer vehicle.

3. An actuator device according to claim 1 in which the trailer brakes are hydraulic brakes having wheel cylinders and said means includes said wheel cylinders and conduits connecting the master cylinders to respective wheel cylinders of the brakes of the trailer vehicle.

4. An actuator device according to claim 1 which includes reservoir means, and said release means comprising a valve means connected between said reservoir and each master cylinder and operable in response to a predetermined relative movement of said vehicles in each of the fore and aft directions for releasing fluid from the master cylinder under pressure to said reservoir means.

5. An actuator device according to claim 1 which includes valve means connected to said cylinders and operable to convey fluid from the pressurized one of said cylinders for actuating said brakes while closing off the other cylinder.

* * * * *